United States Patent [19]

Mendenhall et al.

[11] 4,415,844

[45] Nov. 15, 1983

[54] DIGITAL MOTOR SPEED CONTROLLER

[75] Inventors: Charles E. Mendenhall, Campbell; Michael D. Buckert, Fremont, both of Calif.

[73] Assignee: Priam, San Jose, Calif.

[21] Appl. No.: 230,448

[22] Filed: Feb. 9, 1981

[51] Int. Cl.³ ............................................. H02P 5/06
[52] U.S. Cl. .................................... 318/254; 318/311
[58] Field of Search ...................... 318/254, 309–312, 318/342

[56] References Cited

U.S. PATENT DOCUMENTS

| | | | |
|---|---|---|---|
| 4,234,838 | 11/1980 | Langley et al. | 318/254 X |
| 4,249,116 | 2/1981 | Hieda | 318/254 |
| 4,250,544 | 2/1981 | Alley | 318/254 X |
| 4,256,997 | 3/1981 | Brusaglino et al. | 318/254 |
| 4,270,074 | 5/1981 | Duckworth et al. | 318/254 |
| 4,303,871 | 12/1981 | Berry | 318/254 X |
| 4,344,023 | 8/1982 | Yokobori et al. | 318/254 |

*Primary Examiner*—J. V. Truhe
*Assistant Examiner*—W. E. Duncanson, Jr.
*Attorney, Agent, or Firm*—Flehr, Hohbach, Test, Albritton & Herbert

[57] ABSTRACT

Control apparatus for a polyphase, brushless dc electric motor includes a programmed microprocessor which responds to signals indicative of rotor position and rotational speed to selectively energize the windings of the motor and effect a desired speed. The apparatus is compact, readily fabricated, and more reliable than hard-wired control circuitry.

10 Claims, 6 Drawing Figures

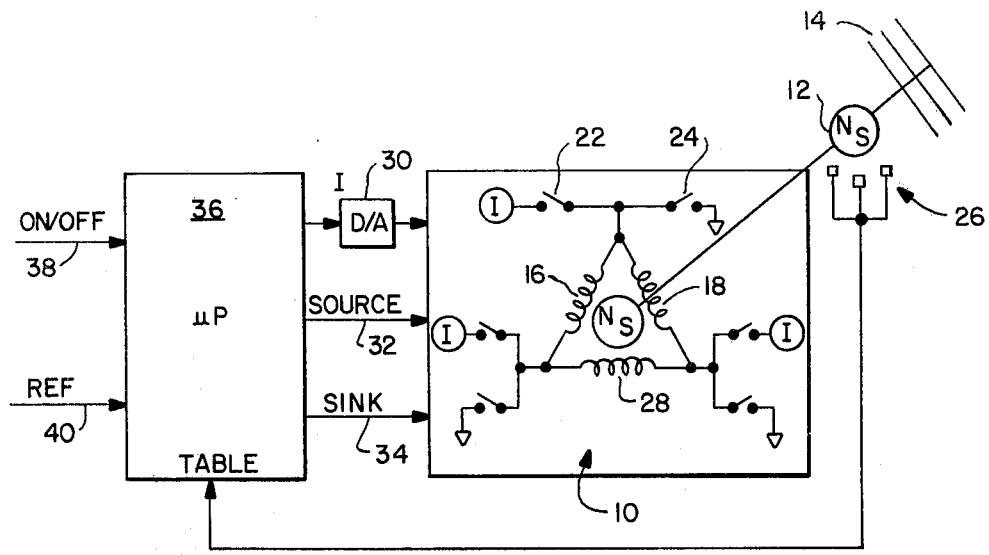
FIG.—1
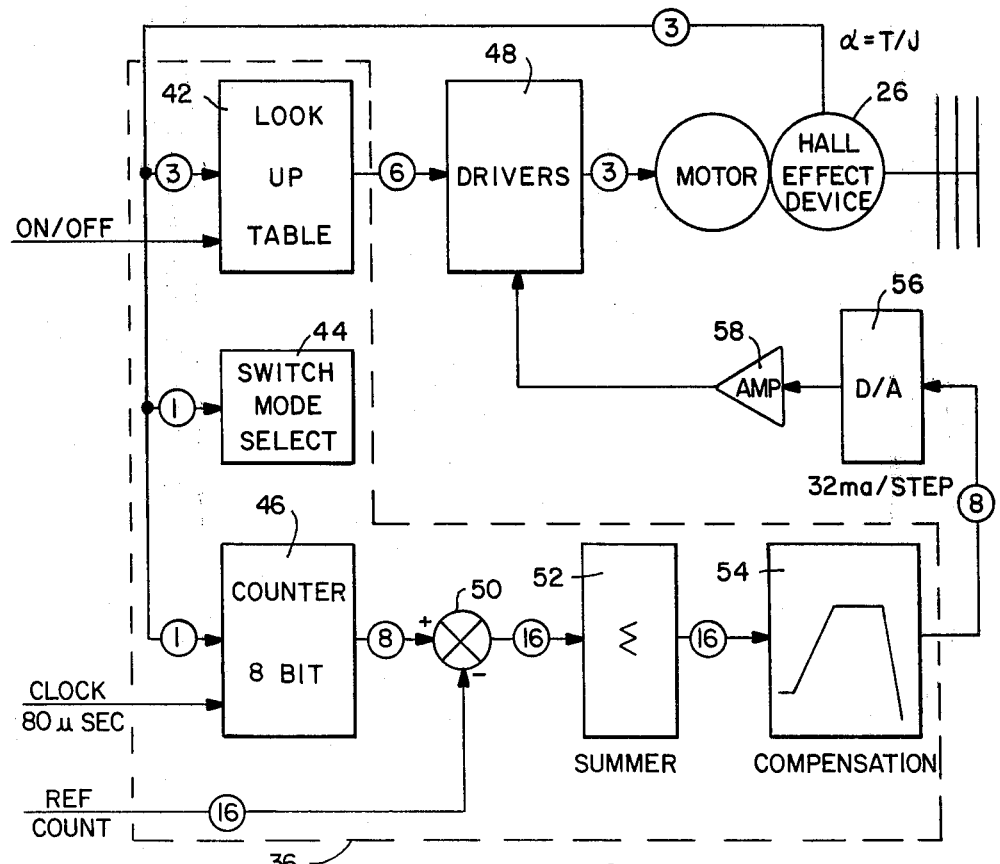
FIG.—2

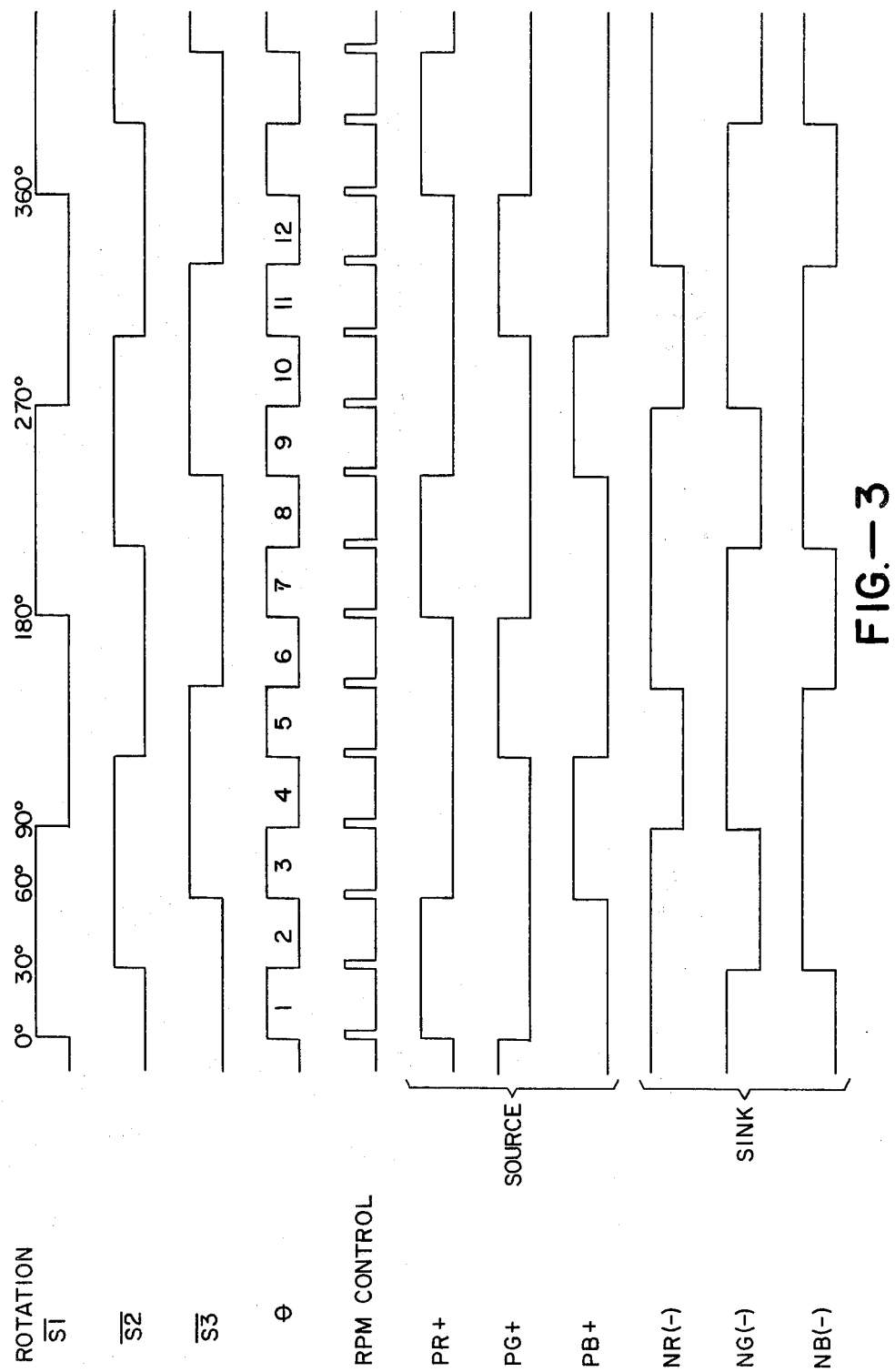

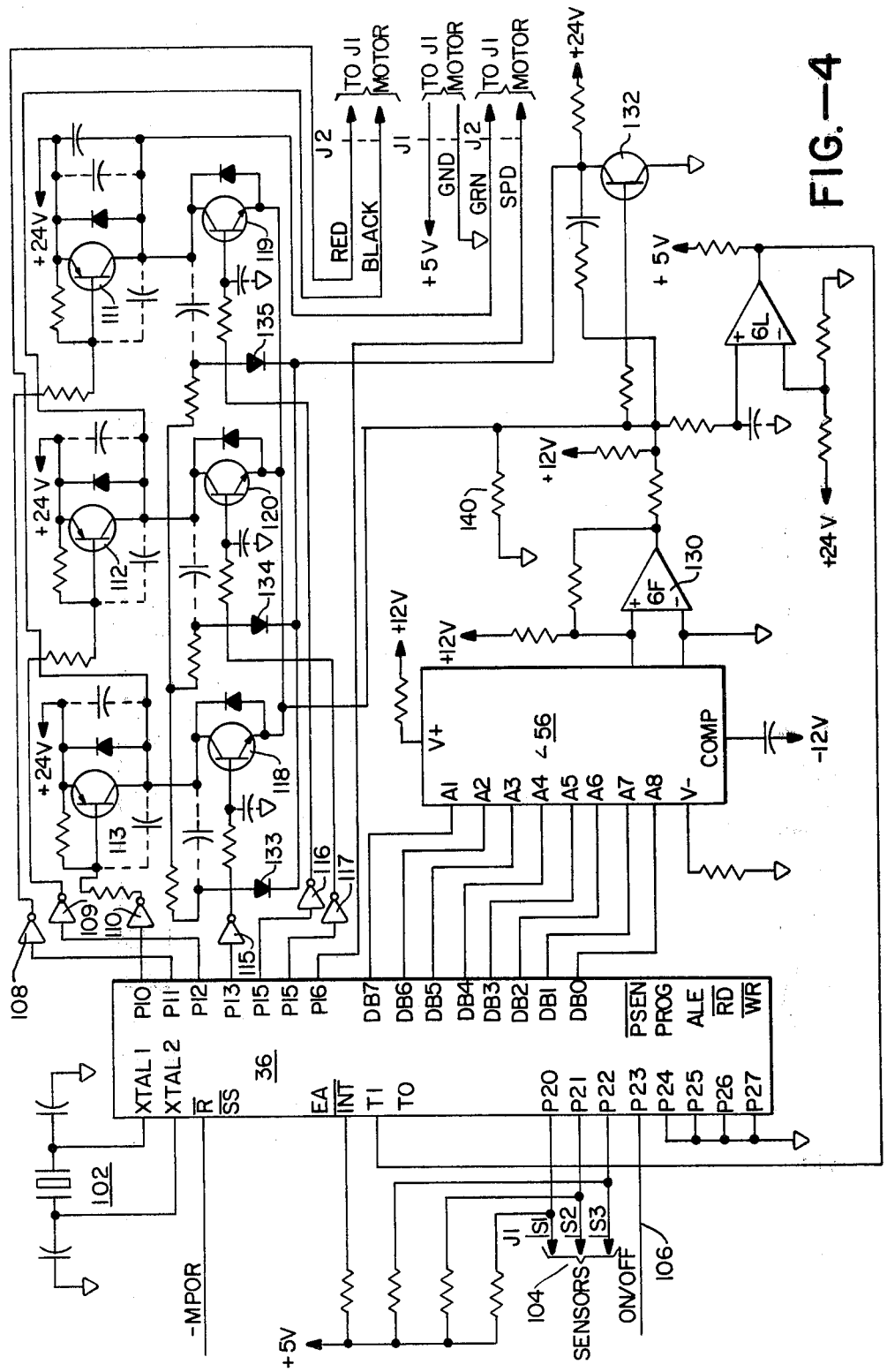
FIG.—4

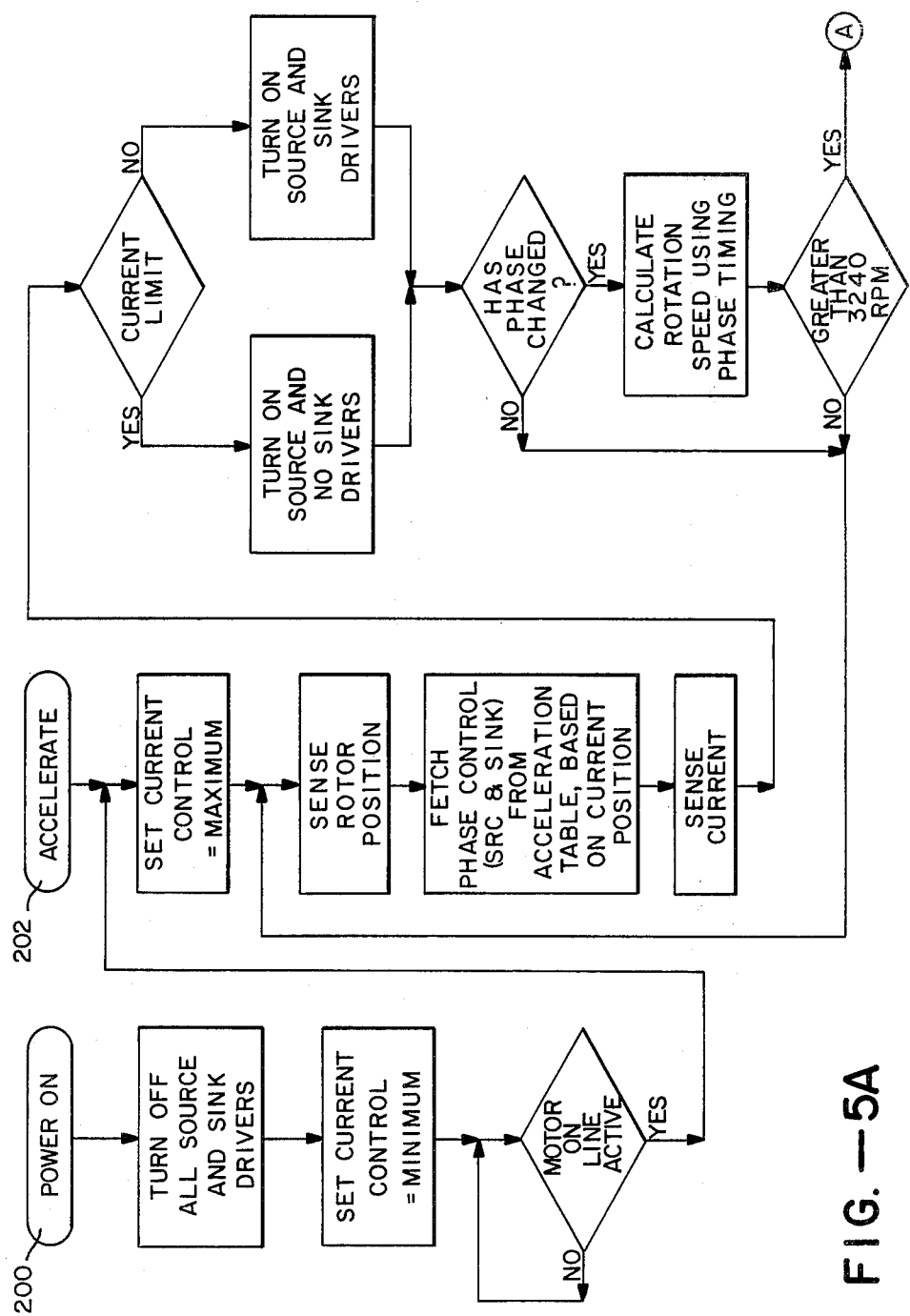
FIG. —5A

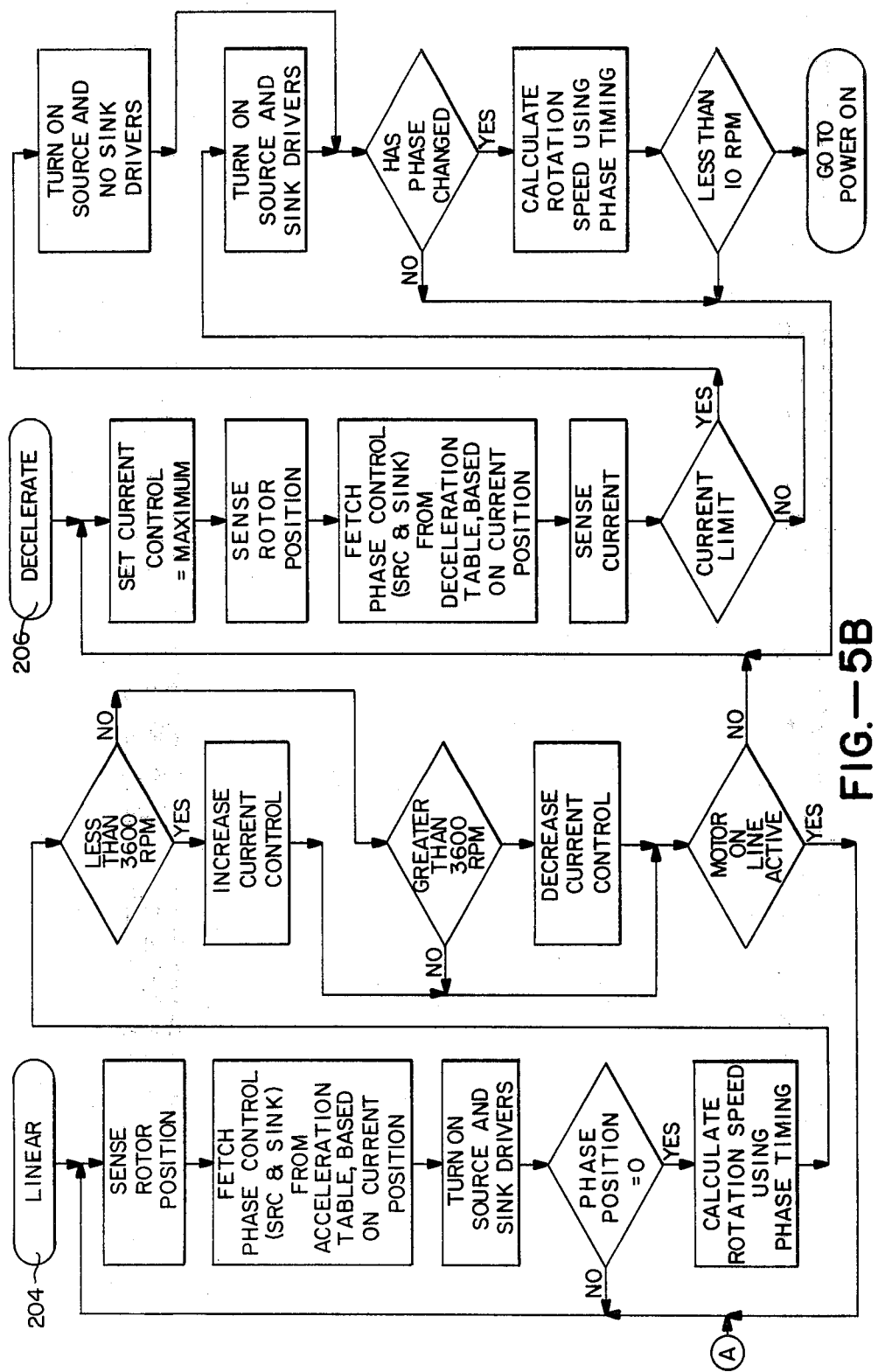
FIG.—5B

DIGITAL MOTOR SPEED CONTROLLER

This invention relates generally to electric motor speed controls, and more particularly the invention relates to the speed control of direct current (DC) motors.

DC motors are utilized in applications such as driving magnetic disc memories where fractional horsepower is required and very accurate speed control is mandatory. The speed of a DC motor is a function of the flux established in the field windings of the motor. Thus, speed control is realized by adjusting the applied field of voltage or field winding current. In the polyphase motor the energization must be varied not only in accordance with the desired speed but also with instantaneous rotor position.

Heretofore, in a polyphase, multiple pole DC motor of the brushless type typically used in spinning the discs in a disc memory, complex circuitry including a number of linear and digital components has been required to monitor rotor speed and provide the necessary feedback to control field winding energization. Known speed controller circuits are relatively complex and expensive, and the circuits typically are fabricated on printed circuit boards which necessitate considerable space. Further, the linear and digital components are sensitive to environmental changes.

An object of the present invention is improved speed control apparatus for a DC motor.

Another object of the invention is speed control circuitry which is compact.

Still another object of the invention is a more accurate method of controlling speed in a DC motor.

Yet another object of the invention is more stable speed control apparatus.

Another object of the invention is a reduction of power supply voltage and current ripple.

Briefly, in accordance with the invention control apparatus for a polyphase brushless DC motor includes switch means for selectively applying a voltage through each phase winding of the motor. Position means is provided for detecting angular position of the rotor of the motor with respect to the stator of the motor, and speed detection means is provided for determining rotational speed of the motor. Computation means receives signals indicative of a reference speed, a detected speed, and the rotor position. The computation means controls the switch means in response to the angular position of the rotor, and the computation means responds to rotational speed of the rotor and controls the current applied through each phase of the motor.

More particularly, the position means generates a digital code indicative of rotor position and the computation means includes a lookup table addressed by the digital code for controlling the switch means. The computation means further includes comparator means for comparing the reference speed and rotational speed of the rotor and providing a digital signal indicative of the difference therebetween. A digital to analog conversion means is responsive to the digital signal and produces a voltage for energizing the phase windings of the motor.

The switch means preferably comprises a voltage source switch and a sink or ground switch connected to each terminal of the windings of the motor whereby each terminal can be selectively energized by the voltage or can be connected to the current sink or ground.

In a preferred embodiment the position sensors are Hall effect devices, and rotor speed is determined by signals generated by the Hall effect devices as the rotor completes one revolution.

The invention and objects and features thereof will be more readily apparent from the following detailed description and appended claims when taken with the drawing, in which:

FIG. 1 is a functional block diagram of a digital speed control apparatus in accordance with one embodiment of the invention.

FIG. 2 is a more detailed block diagram of the functions of the computation means in FIG. 1.

FIG. 3 is timing signals used in controlling the switches in the circuitry of FIG. 1.

FIG. 4 is a detailed schematic of one embodiment of the control apparatus of FIG. 1.

FIG. 5 is a flow diagram of one embodiment of computer software for controlling the computation means of FIG. 1.

Referring now to the drawings, FIG. 1 is a functional block diagram of one embodiment of digital motor speed control apparatus in accordance with the invention. In this embodiment a three phase brushless DC motor includes a stator portion 10 and a rotor portion 12 with the rotor driving a plurality of magnetic discs 14. The stator 10 includes three field windings 16, 18, and 20 connected in a delta configuration. Each terminal of the windings is connected through a switch 22 to an energization source shown as a current source and through a switch 24 to a current sink or circuit ground.

Positioned in the motor in cooperative relationship with the rotor 12 are a plurality of sensors 26 which generate signals indicative of rotor position in the stator 10. The detectors may be optical sensors or Hall effect devices which are equally positioned about the rotor and 120° from one another. As will be described further hereinbelow each sensor generates two signals for each revolution of the rotor, and the generated signals are utilized in providing a digital code indicative of rotor position.

The windings 16, 18, 20 of the stator are driven by a current provided by the digital to analog converter 30 with the source switches 22 and sink switches 24 selectively controlled by lines 32 and 34. The control signals for the source line 33 and sink line 34, and the digital signal applied to the converter 30 are provided by a microprocessor 36. The microprocessor responds to an input signal on line 38 indicative of motor operational state (i.e. on or off) and a reference speed applied over line 40. The microprocessor further receives signals from the sensors 26 which indicate the rotational position of the rotor in the stator as well as rotational speed of the rotor. Rotational speed can be determined by measuring the time for any one sensor to generate signals in response to one complete revolution of the rotor.

FIG. 2 is a more detailed functional block diagram of the microprocessor 36 of FIG. 1. The microprocessor includes a lookup table 42, a switch mode select function 44, and a counter 46 all of which receive inputs from the Hall effect devices 26 associated with the motor. The on/off signal and the digital signal indicative of rotor position are used to address the lookup table 42, and the corresponding value in the table controls the driver switches shown generally at 48. The switch mode select function 44 indicates whether the motor is starting, stopping, or operating at or near a desired speed.

The signals from the Hall effect devices applied to counter 46 control the count of signals from an external clock, and the accumulated count of the counter indicative of rotor speed is compared with a reference count indicative of a desired speed in the comparator 50. The difference from comparator 50 is then summed in summer 52 and applied through a compensator 54 to adjust the difference count to the system characteristics. The resultant digital output from the compensator 54 is then applied to a digital to analog converter 56, and the analog output from the converter 56 drives a power amplifier 58. The voltage from power amplifier 58 is then applied through the source and sink switches to selectively energize the field windings of the motor.

Advantageously, the functions of the control unit can be implemented in the microprocessor without the requirement for complex hardwired circuitry having environmentally sensitive linear and digital components. In a preferred embodiment the microprocessor is an INTEL 8748 device having a 2.5 microsecond cycle time with 1K of storage capacity in a read only memory and 64 bytes storage capacity in an associated random access memory. Speed control with the 8748 microprocessor at 3600 rpm is plus or minus 0.2%.

FIG. 3 is the timing circuitry used with the 8748 microprocessor. The signals from the three Hall effect sensors are designated S1, S2 and S3, and it will be noted that each sensor generates two signals for each revolution of the rotor. By providing the signals from the sensors with a 50% duty cycle and by staggering the signals from respective sensors by 30°, as indicated, 12 pulses indicative of rotor position ($\Delta\theta$) are generated for each revolution of the rotor.

In the described embodiment the three windings of the stator are designated red (R), green (G), and blue (B). The signals for providing power through the source switches are designated PR, PG, and PB, with the source switches being closed in response to a positive signal. The signals for controlling the sink switches are designated NR, NG, and NB, with the sink switches being closed in response to negative level signals. As will be described further hereinbelow, the source signals are inverted and applied to control pnp power transistors, and the sink signals are inverted and applied to control npn power transistors.

The lookup table is addressed by a hexadecimal input with 16 addresses controlling acceleration and deceleration modes of the motor with Power On and 15 addresses controlling operation of the motor with Power Off. The least significant bits of each hexadecimal address are determined by the sensors S1, S2, S3, and the most significant bit is either a zero for motor "on" or a one for motor "off."

The following table gives the values in the lookup table for controlling the source switches and sink switches in response to the hexadecimal inputs for the one mode of operation and the off mode of operation, as shown:

LOOK-UP TABLE

| POWER ON HEX INPUT | | $\Delta\phi$/PWR | − SINK | + SOURCE |
|---|---|---|---|---|
| 00 | ACCELERATE | 0 1 | 1 0 1 | 0 0 1 |
| 01 | MODE | 1 1 | 1 0 1 | 1 0 0 |
| 02 | | 0 1 | 1 1 1 | 0 0 0 |
| 03 | | 0 1 | 1 1 0 | 1 0 0 |
| 04 | | 1 1 | 0 1 1 | 0 0 1 |
| 05 | | 0 1 | 1 1 1 | 0 0 0 |
| 06 | | 0 1 | 0 1 1 | 0 1 0 |
| 07 | | 1 1 | 1 1 0 | 0 1 0 |
| 08 | DECELERATE | 0 1 | 0 1 1 | 0 1 0 |
| 09 | MODE | 1 1 | 0 1 1 | 0 0 1 |
| 0A | | 0 1 | 1 1 1 | 0 0 0 |
| 0B | | 0 1 | 1 0 1 | 0 0 1 |
| 0C | | 1 1 | 1 1 0 | 0 1 0 |
| 0D | | 0 1 | 1 1 1 | 0 0 0 |
| 0E | | 0 1 | 1 1 0 | 1 0 0 |
| 0F | | 1 1 | 1 0 1 | 1 0 0 |
| POWER OFF HEX INPUT | | | | |
| 10 | ACCELERATE | 0 0 | 1 1 1 | 0 0 1 |
| 11 | MODE | 1 0 | 1 1 1 | 1 0 0 |
| 12 | | 0 0 | 1 1 1 | 0 0 0 |
| 13 | | 0 0 | 1 1 1 | 1 0 0 |
| 14 | | 1 0 | 1 1 1 | 0 0 1 |
| 15 | | 0 0 | 1 1 1 | 0 0 0 |
| 16 | | 0 0 | 1 1 1 | 0 1 0 |
| 17 | | 1 0 | 1 1 1 | 0 1 1 |
| 18 | DECELERATE | 0 0 | 1 1 1 | 0 1 0 |
| 19 | MODE | 1 0 | 1 1 1 | 0 0 1 |
| 1A | | 0 0 | 1 1 1 | 0 0 0 |
| 1B | | 0 0 | 1 1 1 | 0 0 1 |
| 1C | | 1 0 | 1 1 1 | 0 1 0 |
| 1D | | 0 0 | 1 1 1 | 0 0 0 |
| 1E | | 0 0 | 1 1 1 | 1 0 0 |
| 1F | | 1 0 | 1 1 1 | 1 0 1 |

FIG. 4 is a detailed schematic of the control circuitry including the 8748 microprocessor 36. In this embodiment the microprocessor operates from a 6 megahertz external oscillator 102 and a plus 5 volts power supply. Inputs from the sensors are applied at 104 and an external off/on signal is applied at 106 with the address code for the above table being generated from the lines 104 and 106.

The signals for controlling the source switches and sink switches in accordance with the above table are applied through inverters 108, 109 and 110, to control the conductance of source power PNP transistors 111, 112, and 113, respectively. Similarly, control signals are applied through inverters 115, 116, and 117 for controlling the conductance of the sink NPN transistors 118, 119, and 120, respectively. It will be noted that the positive signals in FIG. 3 for controlling the source switches are inverted to negative signals with the negative signals controlling the base bias on the PNP transistors 111, 112, 113. Similarly, the negative signals in FIG. 3 for controlling the sink transistors are inverted to positive signals with the positive signals controlling the base bias on the NPN transistors 118, 119, 120.

The magnitude of the current applied through the source and sink transistors is varied in accordance with the difference between a reference speed and a measured speed. The microprocessor 36 generates the difference from a digital code representing the reference speed and a measured speed based upon time required for one revolution of the rotor as determined from the sensor input signals, as described above with reference to FIG. 2. The digital value representing the difference is then applied to a digital to analog converter 56, and the analog output from converter 56 is applied through amplifier 130 to linearly control the bias of transistor 132. The base bias level of transistor 132 is established by resistor 140 through which all sink current flows with output of amplifier 130 linearly varying this level. The conductance of transistor 132, in turn, controls the base current of the sink transistors 118, 119, and 120 by establishing a current path to ground through diodes 133, 134, and 135 connected to the base terminals of the sink transistors. When the actual rotor speed is much less than the reference speed, transistor 132 is less conductive and increased base current increases the conductance of transistors 118–120. Conversely, when rotor speed is greater than the reference speed, transistor 132 is more conductive and the base current of transistors 118–120 is reduced.

FIG. 5 is a flow diagram of the program for controlling microprocessor 36. Beginning with the power on stage 200, all source and sink drivers are initially turned off and the current control is set for a minimal value. If the motor is OFF, the current control is held at a minimum value. Alternatively, if the motor is ON, the program progresses to an accelerate routine at 202. In initially starting the motor the current control is set to a maximum value and the rotor position is sensed. Phase control is established from the lookup table based on the rotor position, and current is sensed. If the current limit has been reached then the sink transistors are turned off. If the current limit is not reached, then both the source and sink driver transistors are selectively rendered conductive. If the phase of the rotor is not changed, then the program subroutine recycles, and if the rotor position has changed the rotation speed is calculated using the phase timing. If the rotational speed is less than 3240 rpm then the program recycles through the acceleration routine, and if the speed is greater than 3240 rpm then the program proceeds to a linear operation routine 204.

In linear operation the rotor position is again sensed and the phase control from the lookup table is again accessed for phase control. If the phase position is not equal to zero then the program recycles through the preceding linear operation. If the phase position is zero then rotor speed is calculated using phase timing. If the rotor speed is less than 3600 rpm then the current control is increased. If the rotor speed is not less than 3600 rpm, and if the speed is greater than 3600 rpm, then the current control is decreased. Thus, the desired speed of 3600 rpm is established and so long as the motor on line remains active the linear cycle of the program is repeated. Once the motor is to be turned OFF, the program proceeds to a decelerate routine 206. For deceleration the current control is set to a maximum value, the rotor position is sensed, and the phase control is fetched from the lookup table. If the current limit has been reached due to back EMF, then all drivers are turned off, whereas if the current limit has not been reached then the source and drivers are selectively turned on. If the phase has not changed then the decelerate routine is recycled. If the phase has changed indicating that the motor is slowing down then the rotor speed is calculated using phase timing. Once the motor speed is less than 10 revolutions per minute, the program returns to the POWER ON routine 200.

The control apparatus as described above for one embodiment has been implemented using an INTEL 8748 microprocessor. Filed herewith and incorporated by reference is a program listing of the source statements using INTEL machine language for the program illustrated in the flow diagram of FIG. 5.

Speed control apparatus using digital computation means in accordance with the present invention has provided more accurate control of brushless type dc motors with varying environmental conditions. The control apparatus is easier to fabricate than the prior art circuitry employing linear and digital components, and the control apparatus occupies much less space.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Control apparatus for a polyphase brushless DC motor comprising switch means for selectively applying a current through each winding of said motor, position means for detecting angular position of the rotor of said motor with respect to the stator of said motor, speed detection means for determining rotational speed of said rotor, computation means, means for applying a reference speed signal to said computation means, means interconnecting said position means to said computation means, means connecting said speed detection means to said computation means, means responsive to said computation means for controlling said switch means in response to angular position of said rotor, and means responsive to rotational speed of said rotor for linearly controlling magnitude of current applied through each phase of said motor.

2. Control apparatus as defined by claim 1 wherein said position means generates a digital code indicative of rotor position and said computation means includes a lookup table addressed by said digital code for controlling said switch means.

3. Control apparatus as defined by claim 2 wherein said computation means includes comparator means for comparing said reference speed signal and a signal indicative of rotation speed and providing a digital signal indicative of the difference therebetween, and digital to analog conversion means responsive to said digital signal and producing a signal for controlling magnitude of current through each phase of said motor.

4. Control apparatus as defined by claim 1 or 3 wherein said switch means comprises a voltage source switch and a sink switch connected to each terminal of said windings whereby each terminal can be selectively energized by said voltage or can be selectively connected to a current sink.

5. Control apparatus as defined by claim 4 wherein said position means comprises Hall effect devices.

6. Control apparatus as defined by claim 4 wherein said position means comprises optical sensors.

7. Control apparatus as defined by claim 1 wherein said computation means comprises a microprocessor.

8. In control apparatus for a polyphase brushless dc motor in which current is applied through motor windings by selectively closing switch means interconnecting said windings with an energization source in accordance with angular position of the rotor of said motor, the improvement of linearly operating said motor with minimal noise generation comprising means for generating a rotor speed signal, means for generating a reference speed signal, comparator means for comparing said reference speed signal and said rotor speed signal, and means responsive to said comparator means for linearly varying the magnitude of current through said motor windings.

9. The improvement as defined by claim 8 wherein said switch means comprises a voltage source switch and a sink switch connected to each terminal of said motor winding whereby each terminal can be selectively energized.

10. The improvement as defined by claim 9 wherein said voltage source switch and said sink switch each comprise a transistor, and said means for linearly varying the magnitude of current through said motor windings varies the conductance of at least one of said transistors.

* * * * *